(12) United States Patent
Hamrick, Jr. et al.

(10) Patent No.: US 10,735,785 B1
(45) Date of Patent: Aug. 4, 2020

(54) SYSTEMS AND METHODS FOR SECURE COMMUNICATIONS BETWEEN MEDIA DEVICES

(71) Applicant: Dish Network L.L.C., Englewood, CO (US)

(72) Inventors: John D. Hamrick, Jr., Englewood, CO (US); Geoffrey C. Kemp, Aurora, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 16/355,401

(22) Filed: Mar. 15, 2019

(51) Int. Cl.
| | |
|---|---|
| H04N 7/167 | (2011.01) |
| H04N 21/2347 | (2011.01) |
| H04N 21/643 | (2011.01) |
| H04L 12/28 | (2006.01) |
| H04L 29/06 | (2006.01) |

(52) U.S. Cl.
CPC ......... *H04N 21/2347* (2013.01); *H04L 12/28* (2013.01); *H04L 63/029* (2013.01); *H04L 63/0272* (2013.01); *H04L 63/0442* (2013.01); *H04L 69/16* (2013.01); *H04N 21/64322* (2013.01)

(58) Field of Classification Search
CPC ................... H04N 21/2347; H04N 21/64322
USPC .......................................................... 725/31
See application file for complete search history.

(56) References Cited

U.S. PATENT DOCUMENTS

| | | | | |
|---|---|---|---|---|
| 4,169,226 A | * | 9/1979 | Fukuji | H03J 9/06 398/106 |
| 4,804,972 A | * | 2/1989 | Schudel | H01Q 1/42 343/840 |
| 5,528,253 A | * | 6/1996 | Franklin | H01Q 1/427 343/840 |
| 6,023,242 A | * | 2/2000 | Dixon | H01Q 21/065 342/359 |
| 6,072,440 A | * | 6/2000 | Bowman | H01Q 1/42 343/840 |
| 6,538,612 B1 | * | 3/2003 | King | H01Q 1/125 343/713 |
| 6,832,070 B1 | * | 12/2004 | Perry | H04B 7/18547 348/E7.06 |
| 6,904,609 B1 | * | 6/2005 | Pietraszak | H04N 21/4431 725/39 |
| 7,075,492 B1 | * | 7/2006 | Chen | H01Q 19/134 343/755 |
| 7,076,202 B1 | * | 7/2006 | Billmaier | H04N 5/44543 348/E5.105 |
| 7,239,274 B2 | * | 7/2007 | Lee | H01Q 1/1257 342/359 |

(Continued)

Primary Examiner — Michael B. Pierorazio
(74) Attorney, Agent, or Firm — Seed IP Law Group LLP

(57) ABSTRACT

An Internet Layer end-to-end security connection (an Internet protocol (IP) encrypted tunnel) is established between a television receiving device and each player device on a home local area network (LAN) as part of the initial pairing process between each player device and the television receiving device. Traffic between the television receiving device and the player device is communicated via IP on the LAN, such that data between the two devices is securely encrypted at the Internet Layer, thus reducing potential security issues related to managing security and encryption at the application layer. This results in a secure virtual private network (VPN) between each player device and the television receiving device.

21 Claims, 7 Drawing Sheets

(56) References Cited

U.S. PATENT DOCUMENTS

| | | | | |
|---|---|---|---|---|
| 7,472,409 B1* | 12/2008 | Linton | H01Q 1/3275 | 342/354 |
| 7,685,621 B2* | 3/2010 | Matsuo | H04N 5/4401 | 348/731 |
| 8,368,611 B2* | 2/2013 | King | H01Q 1/125 | 343/725 |
| 2003/0051246 A1* | 3/2003 | Wilder | H04N 5/44543 | 725/49 |
| 2003/0214449 A1* | 11/2003 | King | H01Q 1/125 | 343/757 |
| 2004/0128689 A1* | 7/2004 | Pugel | H01Q 1/125 | 725/72 |
| 2004/0227655 A1* | 11/2004 | King | H01Q 1/1257 | 341/176 |
| 2005/0108751 A1* | 5/2005 | Dacosta | G06F 3/0482 | 725/39 |
| 2005/0193415 A1* | 9/2005 | Ikeda | H04N 5/44543 | 725/49 |
| 2005/0225495 A1* | 10/2005 | King | H01Q 19/132 | 343/840 |
| 2006/0020978 A1* | 1/2006 | Miyagawa | H04N 5/4401 | 725/72 |
| 2006/0139499 A1* | 6/2006 | Onomatsu | H04B 7/022 | 348/725 |
| 2007/0152897 A1* | 7/2007 | Zimmerman | H01Q 1/28 | 343/757 |
| 2008/0129885 A1* | 6/2008 | Yi | H03J 1/0075 | 348/731 |
| 2008/0186242 A1* | 8/2008 | Shuster | H01Q 1/1257 | 343/762 |
| 2008/0186409 A1* | 8/2008 | Kang | H04B 1/001 | 348/731 |
| 2009/0135309 A1* | 5/2009 | DeGeorge | H04N 5/4401 | 348/732 |
| 2009/0260038 A1* | 10/2009 | Acton | H04N 5/44543 | 725/49 |
| 2009/0310030 A1* | 12/2009 | Litwin | H04N 5/4401 | 348/731 |
| 2010/0214482 A1* | 8/2010 | Kang | H04N 5/50 | 348/563 |
| 2010/0315307 A1* | 12/2010 | Syed | H01Q 1/42 | 343/841 |
| 2011/0126232 A1* | 5/2011 | Lee | H04N 5/765 | 725/39 |
| 2013/0207868 A1* | 8/2013 | Venghaus | H01Q 19/12 | 343/840 |

* cited by examiner

SYSTEMS AND METHODS FOR SECURE COMMUNICATIONS BETWEEN MEDIA DEVICES

TECHNICAL FIELD

The technical field relates to delivering media content, and particularly to providing media content securely between media devices.

BRIEF SUMMARY

A main television receiver (such as a set-top box provided by the cable or satellite television service provider) is connected to the cable or satellite television service provider and that serves as the interface between the backend cable or satellite television service provider system and the home entertainment system on the customer premises. Connected to this television receiver are a number of other receiving devices (player devices) each connected to respective TVs throughout the customer premises. For example, the player devices may be connected to the television receiving device via a home local area network (LAN) and communicate over the LAN with the television receiving device using the transmission control protocol/Internet protocol (TCP/IP) suite of networking communication protocols. These player devices are able to play on their respective TV the live broadcast, recorded, streaming and on-demand programming initially received by the television receiving device from the cable or satellite television service provider or other content provider.

A technical solution that solves security risks associated with communicating programming content and other data over the LAN is provided that establishes an Internet Layer end-to-end security connection (an Internet protocol (IP) encrypted tunnel) between the television receiving device and each player device as part of the initial pairing process between each player device and the television receiving device. Since all traffic between the television receiving device and the player device is communicated via IP on the LAN, all traffic between the two devices is securely encrypted at the Internet Layer, thus reducing potential security issues. This results in a secure virtual private network (VPN) between each player device and the television receiving device.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

Figure 1:
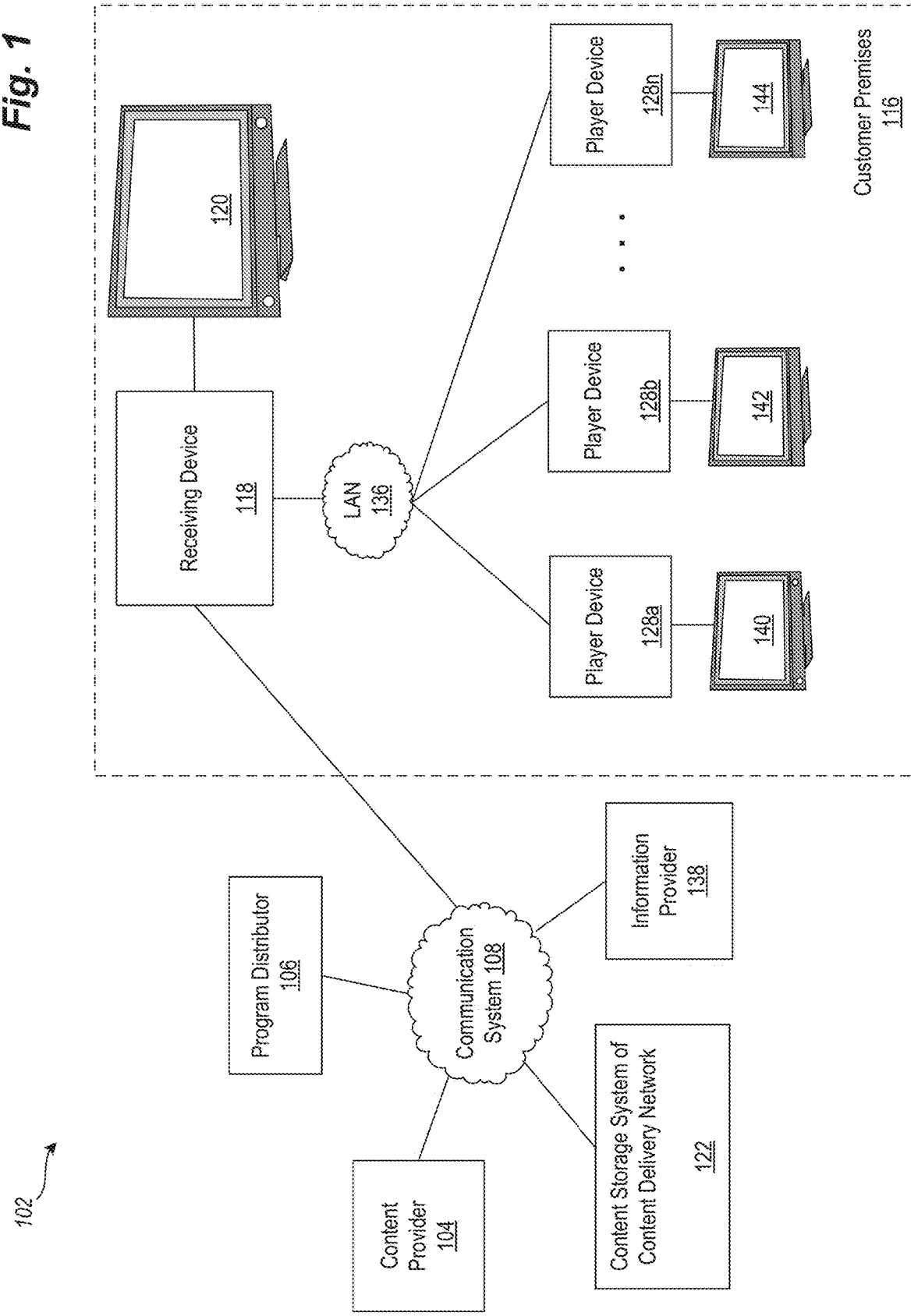
FIG. 1 is an overview block diagram illustrating an example content distribution environment in which embodiments of secure communications between media devices may be implemented, according to one example embodiment.

Being able to seamlessly watch live broadcast, recorded, streaming and on-demand programming anywhere that one has a television (TV) or mobile device is becoming an increasingly sought out feature for home entertainment systems. One solution provides a main television receiver (such as a set-top box provided by the cable or satellite television service provider) that is connected to the cable or satellite television service provider and that serves as the interface between the backend cable or satellite television service provider system and the home entertainment system on the customer premises. Connected to this television receiver are a number of other receiving devices (player devices) each connected to respective TVs throughout the customer premises. For example, the player devices may be connected to the television receiving device via a home local area network (LAN) and communicate over the LAN with the television receiving device using the transmission control protocol/Internet protocol (TCP/IP) suite of networking communication protocols. These player devices are able to play on their respective TV the live broadcast, recorded, streaming and on-demand programming initially received by the television receiving device from the cable or satellite television service provider or other content provider.

However, security of the programming (media content) and other data communicated between the television receiving device and the connected player devices is important to avoid unauthorized capture, use and playing of that media content and data. One solution is for each application running on the television receiving device and/or player device that provides the programming and exchanges data to be responsible for its own key exchange and encryption as needed. This key exchange and encryption occurs at the TCP/IP application layer and must rely on the security measures and processes of each separate application, thus exposing potential security loopholes and security breaches resulting from any weaknesses existing in the security of each application.

An improved technical solution is to instead establish an Internet Layer end-to-end security connection (an Internet protocol (IP) encrypted tunnel) between the television receiving device and each player device as part of the initial pairing process between each player device and the television receiving device. Since all traffic between the television receiving device and the player device is communicated via IP on the LAN, all traffic between the two devices would be securely encrypted at the Internet Layer, thus reducing potential security issues. This results in a secure virtual private network (VPN) between each player device and the television receiving device.

As one example, Video on Demand (VOD) is a system which allows a user to select, watch and/or listen to video and audio content on demand. For example "Internet Television" and "Internet Protocol Television" (IPTV) are systems through which various media content is delivered using the Internet protocol (IP) suite over a packet-switched network such as the Internet or a LAN, instead of being delivered through traditional channels using terrestrial, satellite signal, and cable television formats. In such situations, the device used to initially receive the content may be the television receiving device (e.g., set-top box) provided by the cable provider, satellite provider, or other program distributor to which the customer subscribes for such on-demand services. The various player devices on the customer premises in communication with the television receiving device may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services.

In such situations, it may be even more difficult for the cable provider, satellite provider or program distributor to securely provide such on demand services to those devices, because of the key exchange, encryption and decryption which would usually be performed by each application running on such devices, and due to there being no unique hardware or software control of such devices by the service provider or program distributor. Therefore, having each such player device establish an Internet Layer end-to-end security connection between the television receiving device and the player device as part of the initial pairing process to generate a VPN between each player device and the television receiving device would result in increased security by having all IP traffic between the television receiving device and player device be encrypted.

FIG. 1 is an overview block diagram illustrating an example content distribution environment 102 in which embodiments of secure communications between media devices may be implemented, according to one example embodiment.

Before providing additional details regarding the operation and constitution of methods and systems for secure communications between media devices, the example content distribution environment 102, within which such a system may operate, will briefly be described.

In the content distribution environment 102, audio, video, and/or data service providers, such as television service providers, provide their customers a multitude of video and/or data programming (herein, collectively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

The receiving device 118 interconnects to one or more communications media or sources. For example, the various media content may be delivered as data using the IP suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

Examples of a receiving device 118 may include, but are not limited to devices such as, or any combination of: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive programming via a connection to a satellite or cable television service provider outside the customer premises and communicate that programming to another device over a network. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of secure communications between media devices, which will be described in further detail below.

Examples of a presentation device 120 may include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

In the example embodiment shown in FIG. 1, a plurality of player devices 128a, 128b, 128n are communicatively connected to the television receiving device via a home LAN 136 that generally covers only part or all of the customer premises 116. There may be fewer or additional player devices in various embodiments. Each of the player devices 128a, 128b, 128n communicates over the LAN 136 with the television receiving device using the transmission control protocol/Internet protocol (TCP/IP) suite of networking communication protocols. In various embodiments, all or part of the LAN 136 may be wired or wireless. These player devices are able to receive from the receiving device 118, over LAN 136, and play on their respective connected presentation devices 140, 142, 144, the live broadcast, recorded, streaming and/or on-demand programming initially received by the receiving device 118 from the cable or satellite television service provider. In the present example, the cable or satellite television service provider may encompass or be in communication with some or all of the content provider 104, program distributor 106, content storage system of content delivery network 122, and/or information provider 138.

In particular, a content provider 104 provides program content, such as television content, to a distributor, such as the program distributor 106. Example content providers include television stations which provide local or national television programming and special content providers which provide premium based programming, pay-per-view programming and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In at least one embodiment, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108, such as from the content storage system of a content delivery network 122.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at the content storage system of the content delivery network 122, under direct or indirect control of the program distributor 106, to the receiving device 118. The content storage system of the content delivery network 122 may also comprise multiple separate storage facilities and streaming media content servers geographically separated from each other (also referred to as an "edge cache"), each of which streams stored media content to particular customer locations based on a number of factors such as proximity of the customer premises 116 to the individual content storage system of the content delivery network 122 location or edge cache, load balancing parameters, current demand on the individual content storage system of the content delivery network 122, capacity of the individual content storage system of the content delivery network 122, etc.

Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device or other computing device or media player, and the like, allowing viewing in real time at the customer premises 116, or download it to a receiving device 118 such as a computer, DVR (also called a personal video recorder) or portable media player for viewing at any time. The receiving device 118 may in turn provide each of the player devices 128a, 128b, 128n access to such content from the receiving device 118 over the home LAN 136, such that each player device 128a, 128b, 128n may play the content on their respective connected presentation devices 140, 142, 144, at various locations throughout the customer premises 116. In some embodiments, the presentation device may be integrated as part of the player device. Also, in some embodiments, a player device may communicate with the receiving device 118 to receive such content remotely via the Internet or otherwise via communication system 108. The program distributor 106 may offer VOD streaming, including pay-per-view and free content, whereby a user buys or selects a movie or television program and it begins to play on the presentation device 120 or on other presentation devices 140, 142, 144 via their respective player devices 128a, 128b, 128n almost instantaneously; downloading of the media content to a DVR rented from the program distributor; and/or downloading the content onto a computer or mobile device, for viewing in the future.

In some embodiments, the receiving device 118 may be a set-top box that is typically provided by the cable provider, satellite provider, or other program distributor 106 to which the customer may subscribe to receive such on-demand services and that also receives programming through traditional channels using a terrestrial, satellite signal, and/or cable television format. The various player devices 128a, 128b, 128n on the customer premises in communication with the receiving device 118 may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device or other computing device or media player not provided by or controlled by the cable provider, satellite provider, or other program distributor to which the customer subscribes for the on-demand services.

In such situations, it may be even more difficult for the cable provider, satellite provider or program distributor to securely provide such content to those player devices 128a, 128b, 128n, because of the key exchange, encryption and decryption which would usually be performed by each application running on such player devices 128a, 128b, 128n, and due to there being no unique hardware or software control of such player devices 128a, 128b, 128n by the service provider or program distributor. Therefore, each such player device 128a, 128b, 128n establishing an Internet Layer end-to-end security connection between the receiving device 118 and each player device 128a, 128b, 128n as part of the initial pairing process between each player device 128a, 128b, 128n and the receiving device 118 to generate a VPN over LAN 136 between each player device 128a, 128b, 128n and the receiving device 118 results in increased security by having all IP traffic between the receiving device 118 and each player device 128a, 128b, 128n be encrypted.

In addition, information provider 138 may provide various forms of content and/or services to various devices residing in the customer premises 116. For example, Information provider 138 may also provide information to the receiving device 118 regarding insertion of advertisements or other additional content or metadata into a media content segment provided to the receiving device 118. In some embodiments, such advertisements or other additional content or metadata may be provided by an advertisement server to the content provider 104, directly to the receiving device 118, or be inserted into the streaming media stored on the content storage system of the content delivery network 122 or inserted as it is being streamed to the receiving device 118. The information provider 138 may also, or instead, be another third party entity providing security data and/or services related to authentication, encryption, digital media rights, etc., on behalf of the program distributor 106 or other authorized entity.

Encryption and decryption described herein may be performed as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the content distribution environment 102, the customer premises 116, and the various devices therein, is intended as a broad, non-limiting overview of an example environment in which various embodiments of secure communications between media devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement secure communications between media devices. Other embodiments of the described techniques may be used for other purposes, including secure communications between media devices to be played on various other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
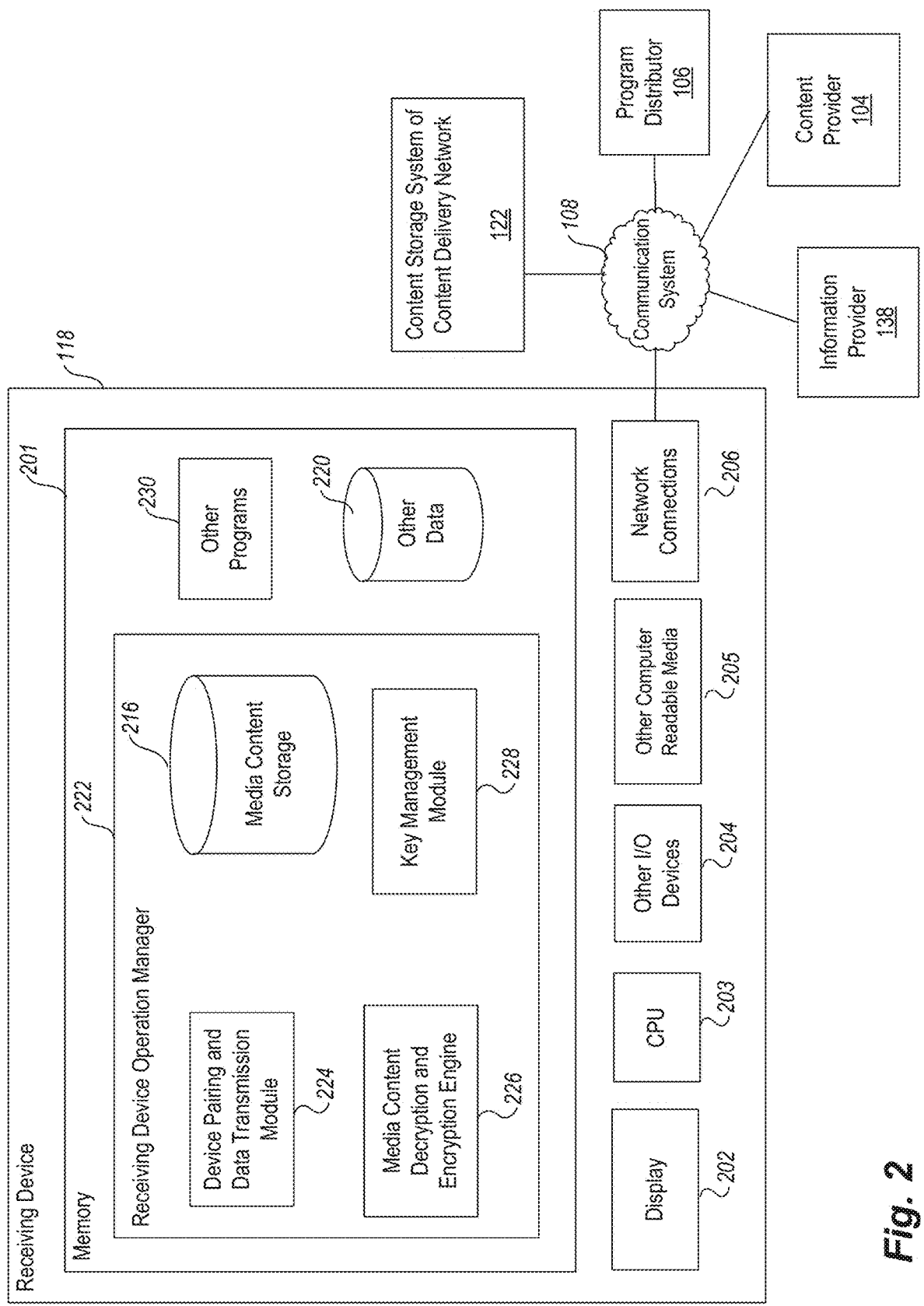
FIG. 2 is a block diagram illustrating elements of an example receiving device used in secure communications between media devices, according to one example embodiment.

FIG. 2 is a block diagram illustrating elements of an example receiving device 118 used in secure communications between media devices, according to one example embodiment.

In one embodiment, the receiving device 118 is a device such as a set-top box, television, DVR, DVD player, PC, tablet device, game machine, smart phone, mobile device or other computing device or media player configured to receive programming via a connection to a satellite or cable television service provider outside the customer premises and to display such programming on a presentation device. For example, the receiving device 118 may be configured to receive, process and display on a presentation device streaming media content received directly from the satellite or cable television service provider and/or other programming received directly from the satellite or cable television service provider such as cable or satellite television broadcasts via various other physical and logical channels of communication.

Note that one or more general purpose or special purpose computing systems/devices may be used to operate the receiving device 118; store information regarding the receiving device 118, store metadata, perform DRM and key management operations, decrypt and encrypt received content; pair with various player devices on a home LAN and/or over the Internet; establish an Internet Layer end-to-end security connection, such as a secure IP tunnel, over the home LAN and/or Internet between the receiving device 118 and various player devices; communicate data, including programming, between the receiving device 118 and various player devices via the Internet Layer end-to-end security connection over the home LAN and/or Internet; and communicate with the content provider 104, program distributor 106, information provider 138 and/or content storage system of the content delivery network 122. In addition, in some embodiments, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decrypting, decoding, processing, selecting, recording, playback and displaying of programming, as well as the establishing of an Internet Layer end-to-end security connection, such as a secure IP tunnel, over the home LAN and/or Internet between the receiving device 118 and various player devices and communication of data, including programming, between the receiving device 118 and various player devices via the Internet Layer end-to-end security connection over the home LAN and/or Internet, as described herein. The receiving device operation manager 222 may also facilitate on-demand media services (e.g., VOD services), on-demand program ordering, processing and DRM and key management and storage corresponding to processing received streaming media content and other programming. The receiving device operation manager 222 may operate as, be part of, or work in conjunction and/or cooperation with various on-demand service software applications stored in memory 201 and on various player devices. The receiving device operation manager 222 also facilitates communication with peripheral devices such as a remote control, via the I/O devices 204, and with the player devices 128*a*, 128*b*, 128*n* and remote systems (e.g., the content provider 104, the content storage system of the content delivery network 122, the program distributor 106, and/or the information provider 138) via the network connections 206.

Recorded or buffered programming received as streaming media content or other types of programming may reside on the media content storage 216, either in decrypted or encrypted form as applicable for securely storing, processing and displaying of the received media content according to the applicable DRM associated with the particular programming. The media content storage 216 may also store various program metadata associated with the recorded or buffered programming stored in the media content storage 216, such as that including, but not limited to, DRM data, tags, codes, identifiers, format indicators, timestamps, user identifications, authorization codes, digital signatures, etc.

A key management module 228 is configured to store decryption keys and other authorization or identification codes as applicable in a secure area of the memory 201 and enable the receiving device 118 to execute establishing of an Internet Layer end-to-end security connection over the LAN between the receiving device 118 and the player devices and to execute the DRM policies and rules associated with received media content. The key management module 228 may be part of or work in conjunction with various on-demand service (e.g., VOD) software applications (which may be part of the other programs 230 residing on memory 201) used to enable a user to order streaming media content programs and other programming via the receiving device 118.

The media content decryption and encryption engine 226 is configured to decrypt and encrypt programming, including, e.g., streaming media content, as it is being received by the receiving device 118 using the applicable cryptographic key(s) stored by key management module according to the DRM and/or VOD software application also residing in memory 201 as part of other programs 230. However, each application running on the receiving device 118 and/or player device that provides the programming and exchanges data being responsible for its own key exchange and encryption relies on the security measures and processes of each separate application, thus exposing potential security loopholes and security breaches resulting from any weaknesses existing in the security of an individual application.

An improved technical solution is the receiving device 118 instead establishing an Internet Layer end-to-end security connection (an Internet protocol (IP) encrypted tunnel) between the receiving device 118 and each player device as part of the initial pairing process between each player device 128*a*, 128*b*, 128*n* (shown in FIG. 1) and the receiving device 118. The device pairing and data transmission module 224 is configured to manage and perform this process. An equivalent module also exists, as applicable, in each player device 128*a*, 128*b*, 128*n* shown in FIG. 1. Since all traffic between the receiving device 118 and an individual player device is communicated via IP on the LAN 136 (and/or Internet in some embodiments), all traffic between the two devices would be securely encrypted at the Internet Layer, thus reducing potential security issues. This results in a secure virtual private network (VPN) between each player device and the receiving device 118.

The device pairing and data transmission module 224 is also configured to process the decrypted streaming media content and render the data for display on a particular presentation device and/or transmission to a player device according to specifications and requirements of the presentation device and/or player device. Working in conjunction with the media content decryption and encryption engine 226, the device pairing and data transmission module 224 may encode, decode, encrypt, decrypt, compress, decompress, format, translate, perform digital signal processing, adjust data rate and/or complexity or perform other processing on the data representing received programming and other media content as applicable for presenting the received content in real time on the presentation device as it is being received by the receiving device 118 and/or for transmission to a player device over the IP encrypted tunnel.

Other code or programs 230 (e.g., further audio/video processing modules, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 include an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, a remote control (not shown), the program distributor 106, the content provider 104, information provider 138, content storage system of the content delivery network 122 or some other module. In this manner, the API may facilitate the development of third-party software, such as various different on-demand service applications, user interfaces, plug-ins, adapters (e.g., for integrating functions of the receiving device operation manager 222 and information provider 138 into desktop applications), and the like to facilitate secure communications between media devices using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to receive decryption keys, access codes, identifications codes, etc., from external devices, such as wirelessly from a player device, other external device, or other external secure system in order to pair with the player device and establish an Internet Layer end-to-end security connection between the receiving device 118 and the player device for securely transmitting data.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The media content storage 216 and other data 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
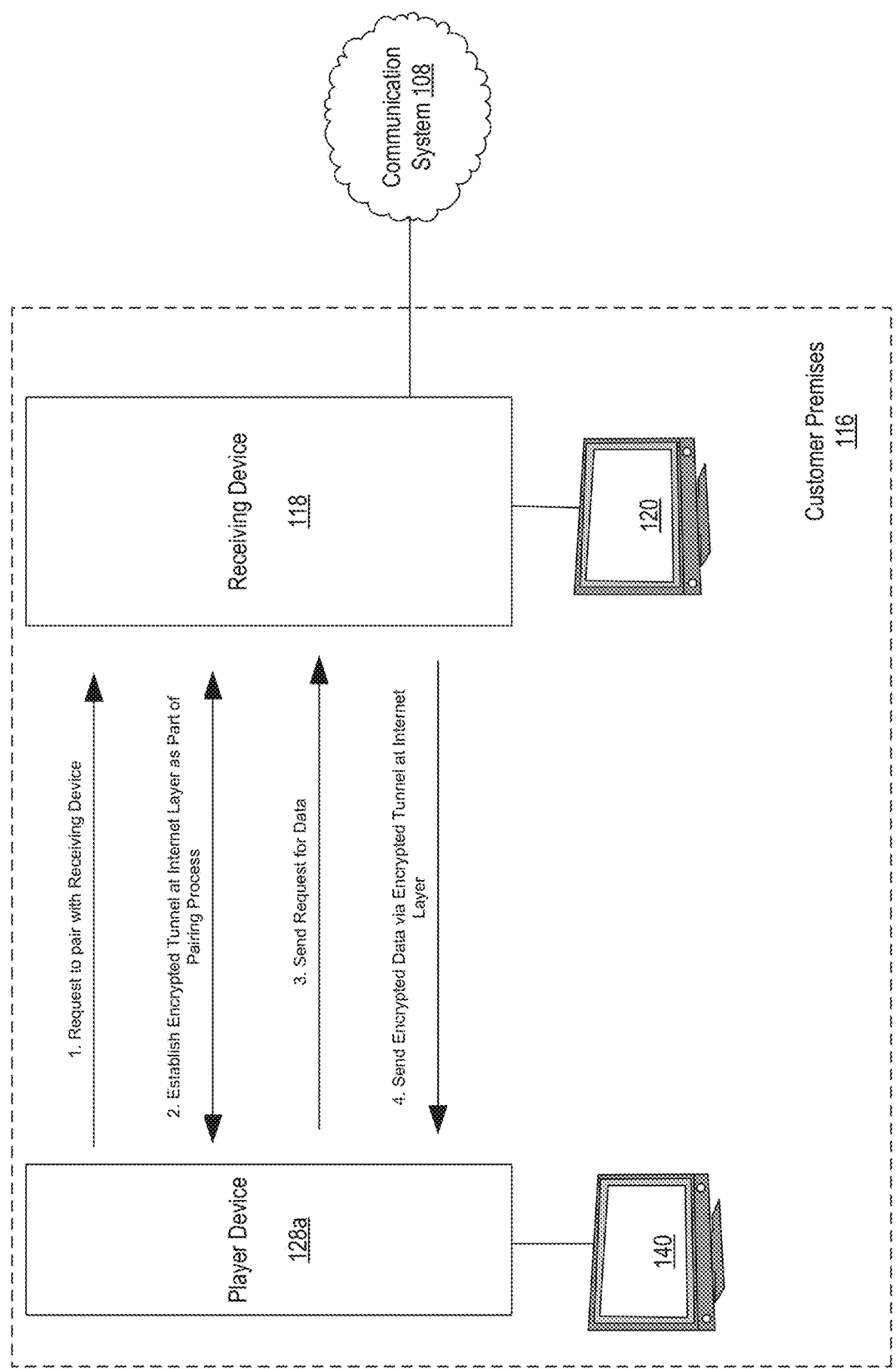
FIG. 3 is a block diagram of an example receiving device and player device illustrating an order of example actions performed by the receiving device and player device when establishing an encrypted tunnel as part of the pairing process between the devices, according to one example embodiment.

FIG. 3 is a block diagram of an example receiving device 118 and player device 128*a* illustrating an order of example actions performed by the receiving device 118 and player device 128*a* when establishing an encrypted tunnel as part of the pairing process between the devices, according to one example embodiment.

The receiving device 118 receives media content via a satellite or cable television service provider via communication system 108. In order to receive such media content, the player device 128*a* must pair with the receiving device 118. For example, the player device 128*a* may pair with the receiving device 118 over a home LAN (such as LAN 136 shown in FIG. 1) on the customer premises 116 to establish a connection between the two devices. The pairing may be an initial connection made automatically or manually initiated between the two devices on the LAN, such as when the player device 128*a* powers up or first appears on the LAN. The player device 128*a* may instead be restarted, rebooted, reinitialized, recognized or discovered on a network, wake up, come out of a power saving mode, reset or otherwise initialized to initiate the process described herein regarding pairing and/or establishing an Internet Layer end-to-end security connection over the LAN between the receiving device and the player device.

The pairing may include each device storing information about the other device (e.g., authentication information) such that communication may occur over the LAN between the two devices that allows transmission of content and other data between the two devices. In various embodiments, the player device 128*a* may include, as applicable, some or all of the structure, hardware and associated functionality of the receiving device 118 shown in FIG. 2. However, the player device 128*a* does not typically receive programming directly from the satellite or cable television service provider over communication system 108 as the receiving device 118 does.

In the example embodiment shown in FIG. 3, the pairing may include the receiving device 118 first receiving a request over the LAN to pair from the player device 128a. The receiving device 118 then establishes an Internet Layer end-to-end security connection over the LAN between the receiving device 118 and the player device 128a. For example, establishing the Internet Layer end-to-end security connection may include performing network tunneling between the receiving device 118 to the player device 128a and/or the Internet Layer end-to-end security connection may be a virtual private network (VPN) between the receiving device 118 and the player device 128a. Requested media content for each of the plurality of different applications will be communicated from the receiving device 118 over the VPN to the player device 128a.

The network tunneling may be performed using a network tunneling protocol, which is a communications protocol that allows for the movement of data from one network to another, enabling private network communications to be sent securely across a public or otherwise insecure network, such as the Internet. Although the techniques describes herein may be applied to protect communications sent over the public Internet, the present example embodiment advantageously performs the tunneling such that private network communications, such as programming content and other private data received from the satellite or cable television service provider, may be sent from the receiving device 118 to the player device 128a securely across the home LAN 136, shown in FIG. 1. Although not public, the home LAN 136 may still be subject to attack from those that are attempting unauthorized access to such content and suffer from other security issues. Therefore, performing network tunneling in this manner to communicate programming content and other private data from the receiving device 118 to the player device 128a securely across the home LAN 136 provides increased security of such data.

Network tunneling may be performed through the encapsulation process, which involves repackaging the traffic data into a different form and using encryption to protect the nature of the traffic that is run through the tunnel. For example, in one embodiment, the Internet Layer end-to-end security connection is an Internet Protocol Security (IPsec) connection over which requested media content for each of a plurality of different applications is communicated between the receiving device 118 and the player device 128a. IPSec defines the architecture for security services for IP network traffic. The IPSec specifications are defined in RFC 4301 "Security Architecture for the Internet Protocol" and RFC 4309 "Using Advanced Encryption Standard (AES) CCM Mode with IPsec Encapsulating Security Payload (ESP)," both published by the Internet Engineering Task Force (IETF). IPsec describes the framework for providing security at the IP Suite Internet Layer, which is the Internet layer of TCIP/IP (or the IP suite or stack), as well as the suite of protocols designed to provide that security, through authentication and encryption of IP network packets. Also included in IPsec are protocols that define the cryptographic algorithms used to encrypt, decrypt and authenticate packets, as well as the protocols needed for secure key exchange and key management.

IPsec is be used to protect network data, for example, by setting up circuits using IPsec tunneling, in which all data being sent between two endpoints is encrypted, which essentially creates a VPN connection; for encrypting application layer data; and for providing security for routers sending routing data across the public Internet. IPsec is defined for use with both current versions of the Internet Protocol, IPv4 and IPv6. For example, the IPsec is an open standard as a part of the IPv4 suite. IPsec uses the following protocols to perform various functions:

Authentication Headers (AH) provides connectionless data integrity and data origin authentication for IP datagrams and provides protection against replay attacks.

Encapsulating Security Payloads (ESP) provides confidentiality, connectionless integrity, data-origin authentication, an anti-replay service (a form of partial sequence integrity), and limited traffic-flow confidentiality.

Security Associations (SA) provides the bundle of algorithms and data that provide the parameters necessary for AH and/or ESP operations. The Internet Security Association and Key Management Protocol (ISAKMP) provides a framework for authentication and key exchange, with actual authenticated keying material provided either by manual configuration with pre-shared keys, Internet Key Exchange (IKE and IKEv2), Kerberized Internet Negotiation of Keys (KINK), or IPSECKEY DNS records.

In one embodiment, the Internet Layer end-to-end security connection is an IP-over-SSH connection over which requested media content for each of a plurality of different applications is communicated between the receiving device 118 and the player device 128a. An IP-over-SSH connection may be established using the sshuttle command to create a Secure Shell or Secure Socket Shell (SSH) tunnel between the receiving device 118 and the player device 128a machine. The sshuttle usage instructions, usage documentation and man page are available at https://sshuttle.readthedocs.io/en/stable/usage.html and https://linux.die.net/man/8/sshuttle. SSH refers both to the cryptographic network protocol and to the suite of utilities that implement that protocol. SSH uses the client-server model, connecting a secure shell client application, the end at which the session is displayed, with an SSH server, the end at which the session runs. \\SSH can be used to create secure tunnels for various application protocols. An SSH server, by default, listens on the standard Transmission Control Protocol (TCP) port 22. In various embodiments, the receiving device 118 or the player device 128a can host the client application or the SSH server.

After the Internet Layer end-to-end security connection over the LAN between the receiving device 118 and the player device 128a is established, the player device 128a may send a request for data to the receiving device 118, such as a request for programming or media content. Such a request may originate from one or more of a plurality of applications running on the player device 128a or be prompted by one or more of a plurality of applications running on the receiving device 118. Such an application may be operating and communicating an Internet Protocol Suite Application Layer. However, all such communications will be encrypted when sent between the receiving device 118 and the player device 128a due to the communications occurring over the previously established Internet Layer end-to-end security connection over the LAN between the receiving device 118 and the player device 128a. For example, for each application of the plurality of different applications of the receiving device 118 that is communicating at an Internet Protocol Suite Application Layer with the player device 128a, the receiving device 118 transmits requested media content for the application from the receiving device 118 to the player device 128a in a secure manner by using the Internet Layer end-to-end security connection over the LAN that was established as part of pairing of the receiving device 118 to the player device.

As part of establishing the Internet Layer end-to-end security connection over the LAN between the receiving device 118 and the player device 128a, at initial pairing between the receiving device 118 and the player device 128a, the receiving device 118 may receive, over the LAN from the player device 128a, a public key of the player device 128a using a public key infrastructure (PKI) for the receiving device 118 to encrypt data to send to the player device 128a using the public key of the player device 128a. The receiving device 118 may then send, over the LAN to the player device 128a, a public key of the receiving device 118a using the PKI for the player device 128a to encrypt data to send to the receiving device 118 using the public key of the television receiving device. Using the PKI for the receiving device 118 to encrypt data to send to the player device 128a may include using an X.509 certificate to perform authentication between the receiving device 118 and the player device 128a at initial pairing between the receiving device 118 and the player device 128a.

In an example of multiple player devices, the receiving device 118 may receive a plurality of public keys using the PKI. Each public key of the plurality of public keys is a respective different public key of a different player device of a plurality of player devices associated with the receiving device 118 for the receiving device 118 to encrypt data at the Internet Layer to send to the plurality of player devices over the LAN. For each player device of the plurality of player devices, the receiving device 118 may use the respective different public key of the player device at initial pairing of the receiving device 118 with the player device 128a to generate a secure Internet Layer tunnel between the receiving device 118 with the player device 128a for encryption at the Internet Layer of data sent between the receiving device 118 and the player device 128a.

Figure 4:
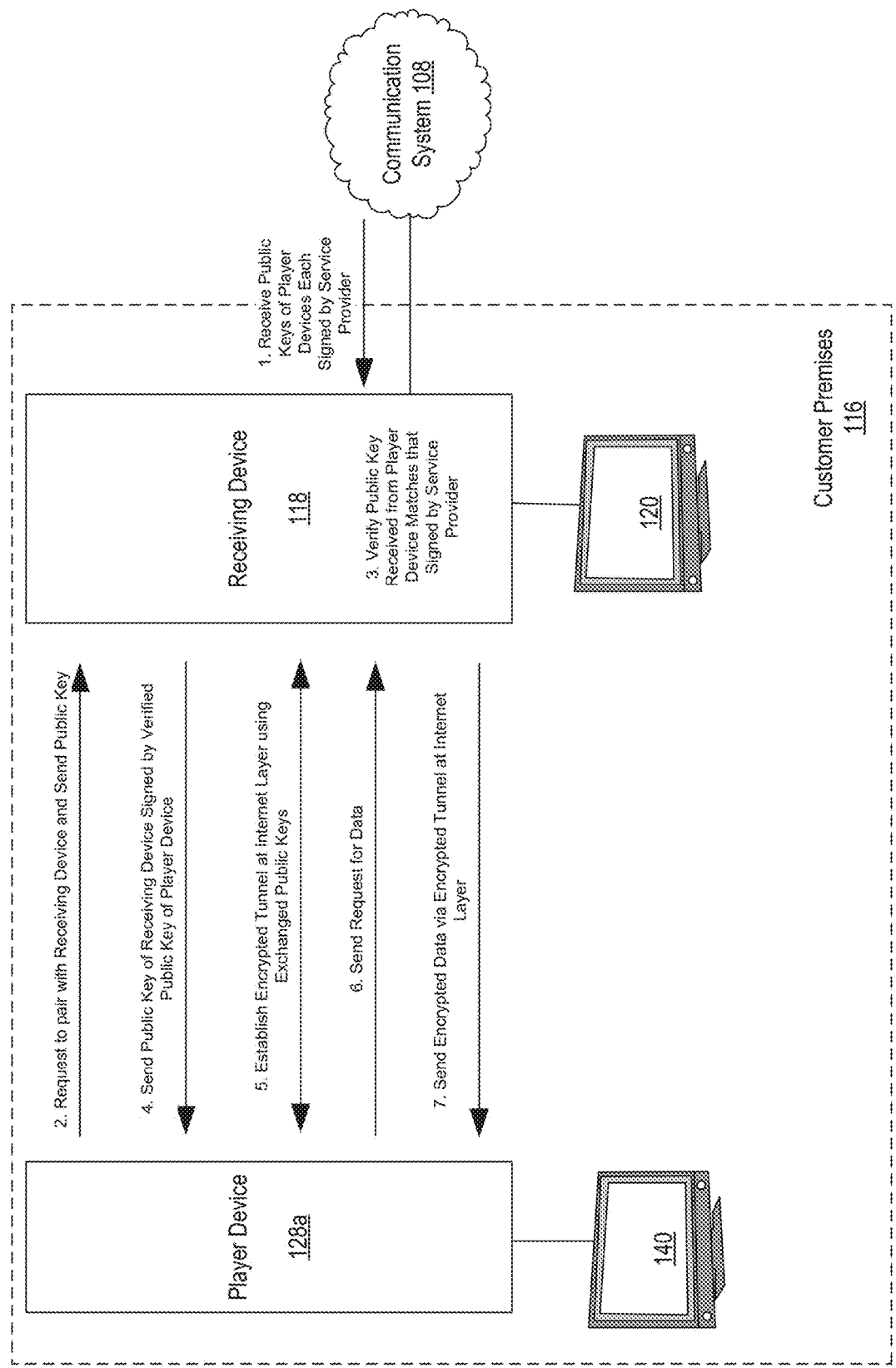
FIG. 4 is a block diagram of an example receiving device and player device illustrating an order of example actions performed by the receiving device and player device when establishing an encrypted tunnel as part of the pairing process between the devices, according to another example embodiment.

FIG. 4 is a block diagram of an example receiving device 118 and player device 128a illustrating an order of example actions performed by the receiving device 118 and player device 128a when establishing an encrypted tunnel as part of the pairing process between the devices, according to another example embodiment.

For additional security, in some embodiments, the receiving device 118 may receive the plurality of public keys from a remote server of the satellite or cable television service provider via a secure Internet connection, such as from the content provider 104, program distributor 106, content storage system of content delivery network 122 and/or information provider 138 over communication system 108. For example, the receiving device 118 may receive the plurality of public keys via a secure satellite connection to the satellite television service provider. In other embodiments, the receiving device 118 may obtain the plurality of public keys from a secure smartcard associated with the satellite or cable television service provider and associated with and inserted into the television receiving device 118.

Each public key of the plurality of public keys received by the receiving device 118 may be signed by a private key of the satellite or cable television service provider. After receiving a request from the player device 128a to pair with the receiving device 118 and receiving a putative public key from the player device 128a, the receiving device 118 may verify that the public key received from the player device 128a is the same as that which has been signed by the private key of the satellite or cable television service provider. Based on the verification that the public key received from the player device 128a is the same as that which has been signed by the private key of the satellite or cable television service provider, the receiving device 118 may send, over the LAN to the player device 128a, the public key of the receiving device 118 encrypted with the respective verified public key of the player device 128a. This process may be repeated individually for multiple player devices on the home LAN 136 (shown in FIG. 1).

The receiving device 118 then establishes an Internet Layer end-to-end security connection over the LAN between the receiving device 118 and the player device 128a using the public keys exchanged between the receiving device 118 and the player device 128a. For example, establishing the Internet Layer end-to-end security connection may include performing network tunneling between the receiving device 118 to the player device 128a and/or the Internet Layer end-to-end security connection may be a virtual private network (VPN) between the receiving device 118 and the player device 128a, over which media content and other data is then communicated from the receiving device 118 to the player device 128a. This process may be repeated individually for multiple player devices on the home LAN 136 (shown in FIG. 1).

In other embodiments, at initial pairing between the receiving device 118 and the player device, the receiving device 118 establishes an Internet Layer end-to-end security connection over the LAN between the receiving device 118 and the player device 128a by generating a symmetric cryptographic key associated with and unique to the player device 128a. The receiving device then communicates the symmetric cryptographic key to the player device 128a for the receiving device 118 and player device 128a to use to encrypt and decrypt all Internet Layer data sent between the receiving device 118 and player device 128a over the home LAN 136 (shown in FIG. 1). This process may be repeated individually for multiple player devices on the home LAN 136 (shown in FIG. 1).

Figure 5:
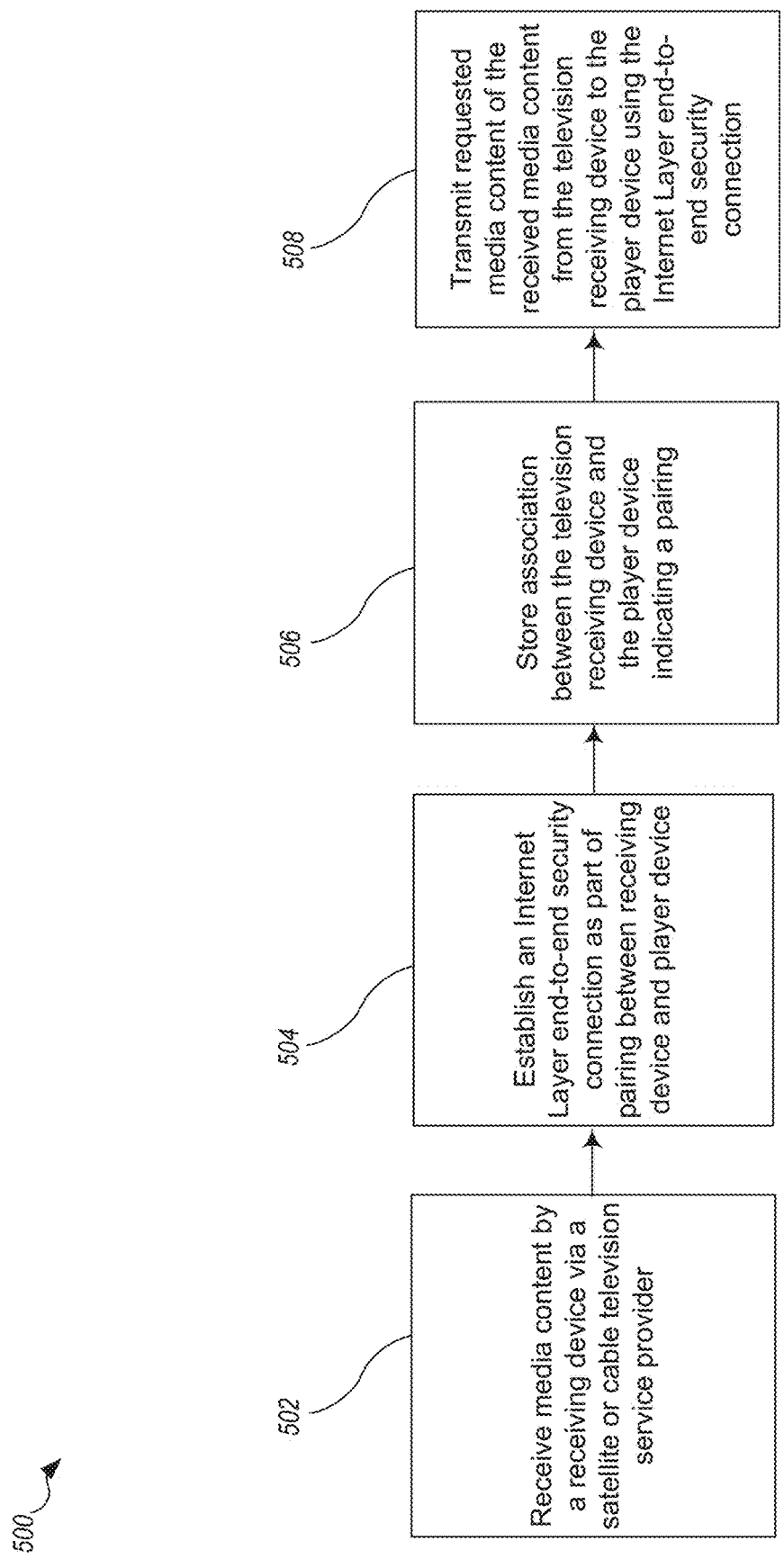
FIG. 5 is a flow diagram of an example method for secure communications between media devices that may be performed by a receiving device, according to one example embodiment.

FIG. 5 is a flow diagram of an example method 500 for secure communications between media devices that may be performed by a receiving device, according to one example embodiment.

At 502, the receiving device receives media content via a satellite or cable television service provider.

At 504, the receiving device performs a pairing between the receiving device and a player device. The player device may be on the same premises as the receiving device and the pairing may occur over a local area network (LAN). The performance of the pairing may include, in response to power-up of the player device, establishing an Internet Layer end-to-end security connection over the LAN between the television receiving device and the player device.

At 506, as part of the pairing, and in response to establishing the Internet Layer end-to-end security connection, the receiving device stores an association between the television receiving device and the player device indicating a pairing of the television receiving device and the player device over the LAN.

At 508, the receiving device transmits requested media content of the received media content from the receiving device to the player device in a secure manner by using the Internet Layer end-to-end security connection over the LAN that was established as part of pairing of the television receiving device to the player device.

Figure 6:
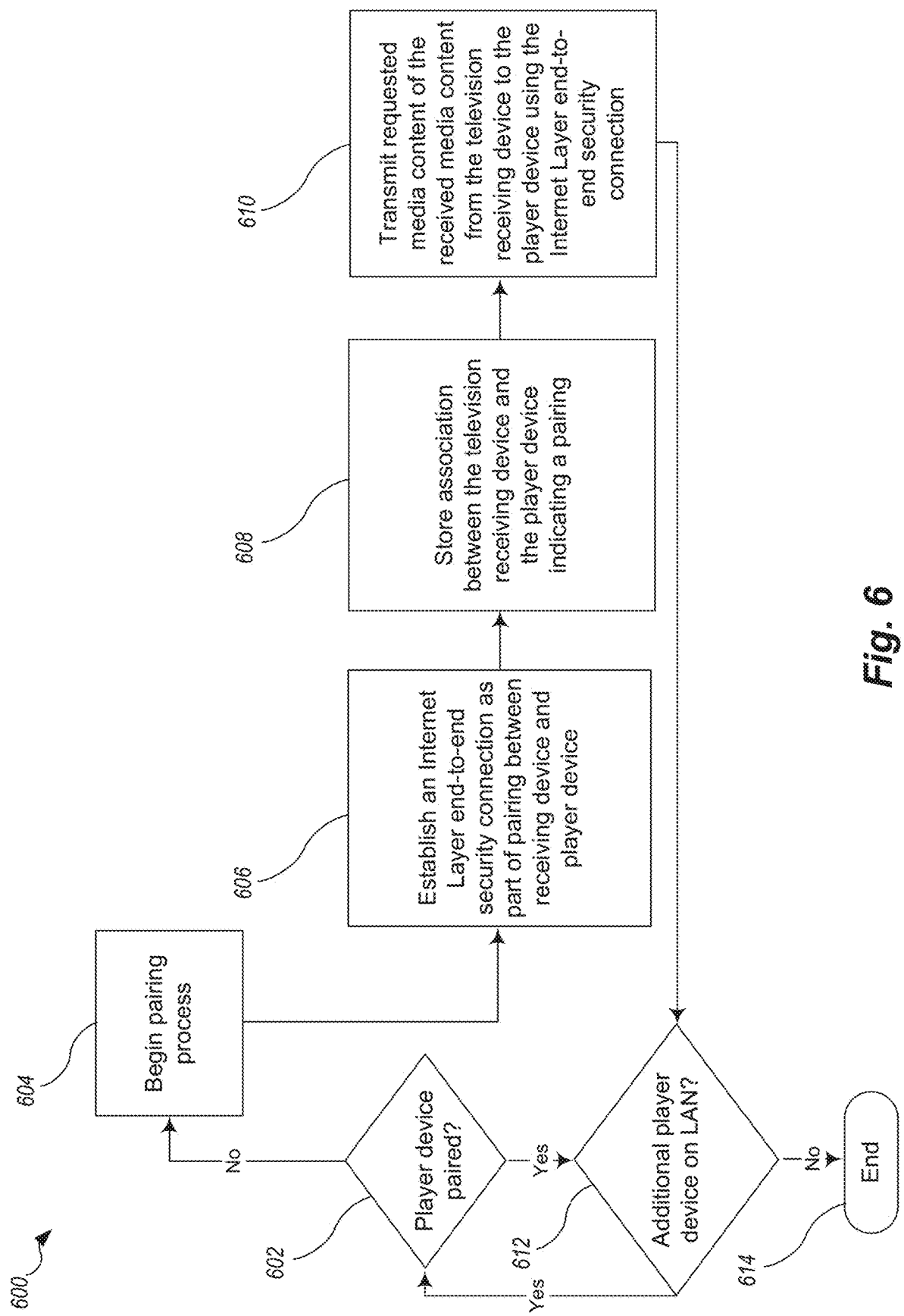
FIG. 6 is a flow diagram of an example method for secure communications between media devices, including pairing of multiple player devices to a receiving device, according to one example embodiment.

FIG. 6 is a flow diagram of an example method 600 for secure communications between media devices, including pairing of multiple player devices to a receiving device, according to one example embodiment.

At 602, the receiving device determines whether a player device recognized on the LAN is paired to the receiving device. If the receiving device determines that the player device recognized on the LAN is not paired to the receiving device (such as by discovering the player device on the LAN upon power up, resetting or restarting of the player device, or receiving a request form the player device to be paired with the receiving device) then the method proceeds to 604 to initiate the pairing process. If the receiving device determines that the player device recognized on the LAN is paired to the receiving device, then the method proceeds to 612.

At 604, the receiving device begins the process of pairing the player device to the receiving device over the LAN.

At 606, as part of the pairing process, the receiving device establishes an Internet Layer end-to-end security connection over the LAN between the television receiving device and the player device.

At 608, as part of the pairing, and in response to establishing the Internet Layer end-to-end security connection, the receiving device stores an association between the television receiving device and the player device indicating a pairing of the television receiving device and the player device over the LAN.

At 610, the receiving device transmits requested media content to the player device in a secure manner by using the Internet Layer end-to-end security connection over the LAN that was established as part of pairing of the television receiving device to the player device.

At 612, the receiving device determines whether there exists an additional player device on the LAN. If the receiving device determines there exists an additional player device on the LAN, the method proceeds to 602 to determine whether that device is paired to the receiving device. If the receiving device determines there does not exist an additional player device on the LAN, the method proceeds to 614 where the method ends.

Figure 7:
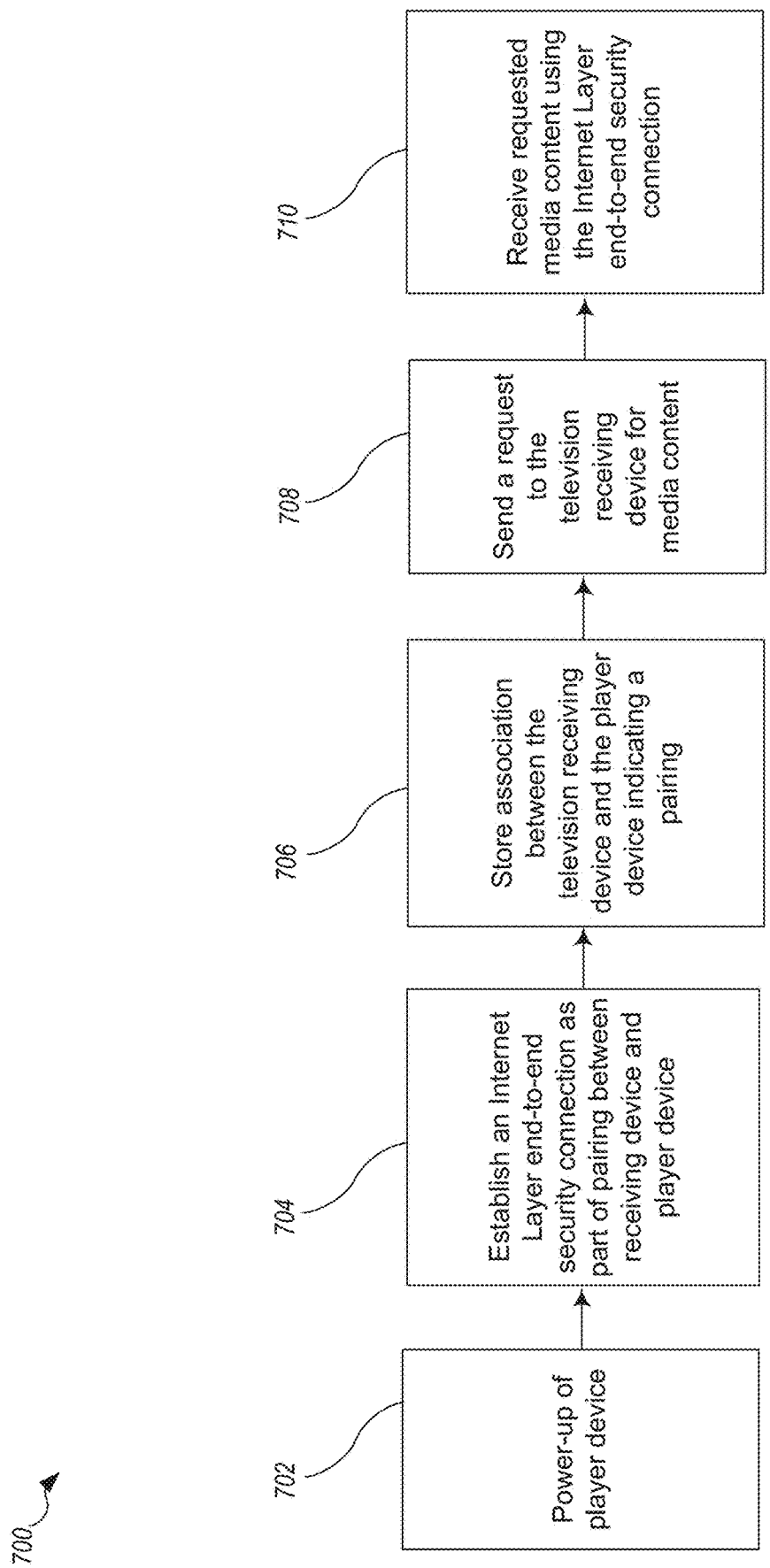
FIG. 7 is a flow diagram of an example method for secure communications between media devices that may be performed by a player device, according to one example embodiment.

FIG. 7 is a flow diagram of an example method 700 for secure communications between media devices that may be performed by a player device, according to one example embodiment.

At 702, the player device powers up. In some embodiments, the player device may instead be restarted, rebooted, reinitialized, recognized or discovered on a network, wake up, come out of a power saving mode, reset or otherwise be initialized to initiate the process described herein regarding establishing an Internet Layer end-to-end security connection over the LAN between the receiving device and the player device.

At 704, in response to power-up of the player device, the player device establishes an Internet Protocol Suite Internet Layer (Internet Layer) end-to-end security connection over the LAN between the receiving device and the player device.

At 706, in response to establishing the Internet Layer end-to-end security connection, the player device stores an association between the television receiving device and the player device indicating a pairing of the receiving device and the player device over the LAN.

At 708, the player device sends a request to the receiving device for media content that was received by the television receiving device from a satellite or cable television service provider.

At 710, in response to the request, the player device receives the requested media content from the television receiving device in a secure manner by using the Internet Layer end-to-end security connection over the LAN that was established as part of pairing of the receiving device to the player device.

While various embodiments have been described herein above, it is to be appreciated that various changes in form and detail may be made without departing from the spirit and scope of the invention(s) presently or hereafter claimed.

The invention claimed is:

1. A method for secure communications between media devices, the method comprising:
  receiving, by a television receiving device, media content via a satellite or cable television service provider;
  performing, by the television receiving device, a pairing between the television receiving device and a player device that is on a same premises as the television receiving device over a local area network (LAN), the performing of the pairing including:
    in response to power-up of the player device, establishing, by the television receiving device, an Internet Protocol Suite Internet Layer (Internet Layer) end-to-end security connection over the LAN between the television receiving device and the player device; and
    in response to establishing the Internet Layer end-to-end security connection, storing, by the television receiving device, an association between the television receiving device and the player device indicating a pairing of the television receiving device and the player device over the LAN; and
  transmitting, by the television receiving device, requested media content of the received media content from the television receiving device to the player device in a secure manner by using the Internet Layer end-to-end security connection over the LAN that was established as part of pairing of the television receiving device to the player device.

2. The method of claim 1, further comprising:
  for each application of a plurality of different applications of the television receiving device that is communicating at an Internet Protocol Suite Application Layer with the player device, transmitting, by the television receiving device, requested media content of the received media content for the application from the television receiving device to the player device in a secure manner by using the Internet Layer end-to-end security connection over the LAN that was established as part of pairing of the television receiving device to the player device.

3. The method of claim 2 wherein the Internet Layer end-to-end security connection is an Internet Protocol Security (IPsec) connection over which requested media content for each of the plurality of different applications is communicated.

4. The method of claim 2 wherein the Internet Layer end-to-end security connection is an IP-over-SSH connection over which requested media content for each of the plurality of different applications is communicated from the television receiving device to the player device.

5. The method of claim 2 wherein the establishing of the Internet Layer end-to-end security connection includes establishing a virtual private network between the television receiving device and the player device over which requested media content for each of the plurality of different applications will be communicated from the television receiving device to the player device.

6. The method of claim 1 wherein the establishing of the Internet Layer end-to-end security connection includes performing network tunneling between the television receiving device to the player device.

7. The method of claim 1 wherein all network traffic between the television receiving device and the player device is communicated using Internet Protocol (IP) and securely encrypted by using the Internet Layer end-to-end security connection over the LAN that was established as part of pairing of the television receiving device to the player device.

8. The method of claim 1, further comprising:
for each player device of a plurality of player devices that is on the same premises as the television receiving device:
performing, by the television receiving device, a pairing between the television receiving device and the player device over the LAN, the performing of the pairing including:
in response to power-up of the player device, establishing, by the television receiving device, an Internet Layer end-to-end security connection over the LAN between the television receiving device and the player device; and
in response to establishing the Internet Layer end-to-end security connection, storing, by the television receiving device, an association between the television receiving device and the player device indicating a pairing of the television receiving device and the player device over the LAN; and
transmitting, by the television receiving device, requested media content of the received media content from the television receiving device to the player device in a secure manner by using the Internet Layer end-to-end security connection over the LAN that was established as part of pairing of the television receiving device to the player device.

9. The method of claim 1 wherein establishing the Internet Layer end-to-end security connection over the LAN between the television receiving device and the player device includes:
at initial pairing between the television receiving device and the player device:
receiving, by the television receiving device over the LAN from the player device, a public key of the player device using a public key infrastructure (PKI) for the television receiving device to encrypt data to send to the player device using the public key of the player device; and
sending, by the television receiving device over the LAN to the player device, a public key of the television receiving device using the PKI for the player device to encrypt data to send to the television receiving device using the public key of the television receiving device.

10. The method of claim 9 wherein the using the PKI for the television receiving device to encrypt data to send to the player device includes using an X.509 certificate to perform authentication between the television receiving device and the player device at initial pairing between the receiving device and the player device.

11. The method of claim 9, further comprising:
receiving, by the television receiving device, a plurality of public keys using the PKI, wherein each public key of the plurality of public keys is a respective different public key of a different player device of a plurality of player devices associated with the television receiving device for the television receiving device to encrypt data at the Internet Layer to send to the plurality of player devices over the LAN; and
for each player device of the plurality of player devices, used by the television receiving device, the respective different public key of the player device at initial pairing of the television receiving device with the player device to generate a secure Internet Layer tunnel between the television receiving device with the player device for encryption at the Internet Layer of data sent between the television receiving device and the player device.

12. The method of claim 11 wherein the receiving the plurality of public keys includes receiving the plurality of public keys from a remote server of the satellite or cable television service provider via a secure Internet connection.

13. The method of claim 11 wherein the television receiving device is a satellite television receiver and the receiving the plurality of public keys includes receiving the plurality of public keys via a secure satellite connection to the satellite television service provider.

14. The method of claim 11 wherein the receiving the plurality of public keys includes obtaining the plurality of public keys from a secure smartcard associated with the satellite or cable television service provider and associated with and inserted into the television receiving device.

15. The method of claim 11 wherein each public key of the plurality of public keys received by the television receiving device is signed by a private key of the satellite or cable television service provider and the using of the respective different public key of the player device at initial pairing of the television receiving device with the player device to generate a secure Internet Layer tunnel between the television receiving device with the player device includes:
verifying, by the television receiving device, that the respective different public key of the player device has been signed by the private key of the satellite or cable television service provider; and
based on the verification that the respective different public key of the player device has been signed by the private key of the of the satellite or cable television service provider, initiating the sending, by the television receiving device over the LAN to the player device, the public key of the television receiving device encrypted with the respective different public key of the player device.

16. The method of claim 1 wherein establishing the Internet Layer end-to-end security connection over the LAN between the television receiving device and the player device includes:
at initial pairing between the television receiving device and the player device:
generating, by the television receiving device, a symmetric cryptographic key associated with and unique to the player device; and
communicating, by the television receiving device, the symmetric cryptographic key to the player device for the television receiving device and player device to use to encrypt and decrypt all Internet Layer data sent between the television receiving device and player device over the LAN.

17. The method of claim 16, further comprising:
for each player device of a plurality of player devices that is on the same premises as the television receiving device, at initial pairing between the television receiving device and the player device:

generating, by the television receiving device, a symmetric cryptographic key associated with and unique to the player device; and communicating, by the television receiving device, the symmetric cryptographic key to the player device for the television receiving device and player device to use to encrypt and decrypt all Internet Layer data sent between the television receiving device and player device over the LAN.

18. A system for secure communications between media devices comprising:

at least one processor; and at least one memory coupled to the at least one processor, the at least one memory having instructions thereon that, when executed by the at least one processor, cause the following to be performed:

for each player device of a plurality of player devices that is on a same premises as a television receiving device:

performing a pairing between the television receiving device and the player device over a local area network (LAN), the performing of the pairing including:

in response to power-up of the player device, establishing, by the television receiving device, an Internet Layer end-to-end security connection over the LAN between the television receiving device and the player device; and in response to establishing the Internet Layer end-to-end security connection, storing an association between the television receiving device and the player device indicating a pairing of the television receiving device and the player device over the LAN; and transmitting requested media content of the received media content from the television receiving device to the player device in a secure manner by using the Internet Layer end-to-end security connection over the LAN that was established as part of pairing of the television receiving device to the player device.

19. The media content transmission system of claim 18 wherein the Internet Layer end-to-end security connection is either an Internet Protocol Security (IPsec) connection or an IP-over-SSH connection, over which the requested media content is communicated.

20. A non-transitory computer-readable storage medium having computer-executable instructions stored thereon that, when executed, cause the following to be performed:

performing a pairing between a television receiving device and a player device that is on a same premises as the television receiving device over a local area network (LAN), the performing of the pairing including:

in response to power-up of the player device, establishing an Internet Protocol Suite Internet Layer (Internet Layer) end-to-end security connection over the LAN between the television receiving device and the player device; and in response to establishing the Internet Layer end-to-end security connection, storing an association between the television receiving device and the player device indicating a pairing of the television receiving device and the player device over the LAN;

sending a request to the television receiving device for media content that was received by the television receiving device from a satellite or cable television service provider; and in response to the request, receiving, by player device, the requested media content from the television receiving device in a secure manner by using the Internet Layer end-to-end security connection over the LAN that was established as part of pairing of the television receiving device to the player device.

21. The non-transitory computer-readable storage medium of claim 20 wherein the computer-executable instructions, when executed, further cause the following to be performed:

for each application of a plurality of different applications of the television receiving device that is communicating at an Internet Protocol Suite Application Layer with the player device, obtaining from the television receiving device, by the player device, media content associated with the application in a secure manner by using the Internet Layer end-to-end security connection over the LAN that was established as part of initial pairing of the television receiving device to the player device.

* * * * *